United States Patent
Pfister

(10) Patent No.: US 9,440,295 B2
(45) Date of Patent: Sep. 13, 2016

(54) HYDRAULIC EXPANDING LOCK

(76) Inventor: Rainer Pfister, Burladingen (DE)

( * ) Notice: Subject to any disclaimer, the term of this patent is extended or adjusted under 35 U.S.C. 154(b) by 526 days.

(21) Appl. No.: 13/812,660

(22) PCT Filed: Jul. 25, 2011

(86) PCT No.: PCT/EP2011/062731
§ 371 (c)(1),
(2), (4) Date: Jan. 28, 2013

(87) PCT Pub. No.: WO2012/013629
PCT Pub. Date: Feb. 2, 2012

(65) Prior Publication Data
US 2013/0119618 A1    May 16, 2013

(30) Foreign Application Priority Data
Jul. 26, 2010   (DE) .................. 10 2010 032 284

(51) Int. Cl.
  *B23B 31/10*    (2006.01)
  *B23B 31/107*   (2006.01)
  *B23B 31/30*    (2006.01)
  *B23B 31/00*    (2006.01)

(52) U.S. Cl.
  CPC ........... *B23B 31/305* (2013.01); *B23B 31/008* (2013.01); *B23B 31/1075* (2013.01); *Y10T 279/1216* (2015.01); *Y10T 279/17821* (2015.01)

(58) Field of Classification Search
  CPC ............ B23B 31/008; B23B 31/1075; B23B 31/305; Y10T 279/1216; Y10T 279/17821
  USPC ................................... 279/4.03, 83, 4.01, 76
  See application file for complete search history.

(56) References Cited

U.S. PATENT DOCUMENTS 3,830,509 A * 8/1974 Weber .................. 279/2.08
4,266,895 A * 5/1981 Lewis .................. 409/232
(Continued)

FOREIGN PATENT DOCUMENTS

DE        90 02 248      6/1990
DE     10 2006 028408    10/2007
(Continued)

OTHER PUBLICATIONS

English machine translations of German Patent DE9002248U1 issued to Schunk, F, Jun. 21, 1990.*
(Continued)

*Primary Examiner* — Eric A Gates
*Assistant Examiner* — Chwen-Wei Su
(74) *Attorney, Agent, or Firm* — Renner, Otto, Boisselle & Sklar, LLP

(57) ABSTRACT

The invention relates to a hydraulic expanding chuck (1) having a main body (2) and an expanding bush (3), which is inserted into the main body (2) to form at least one pressure chamber (5a, 5b) and is intended for chucking a tool. The expanding bush (3) has a radial opening (20), which is arranged in alignment with a driver (21) which is held adjustably in the main body (2) and can be moved via the opening (20) into positive engagement with a driving surface (22) on the tool shank of a tool to be received in the expanding bush (3). According to the invention, the driver (21) has a driver screw (23), which can be driven from radially outside the hydraulic expanding chuck (1) and is screwed into a threaded bore (24) formed in the main body (2) in alignment with the radial opening (20).

9 Claims, 5 Drawing Sheets

(56) References Cited

U.S. PATENT DOCUMENTS

Figure 1:
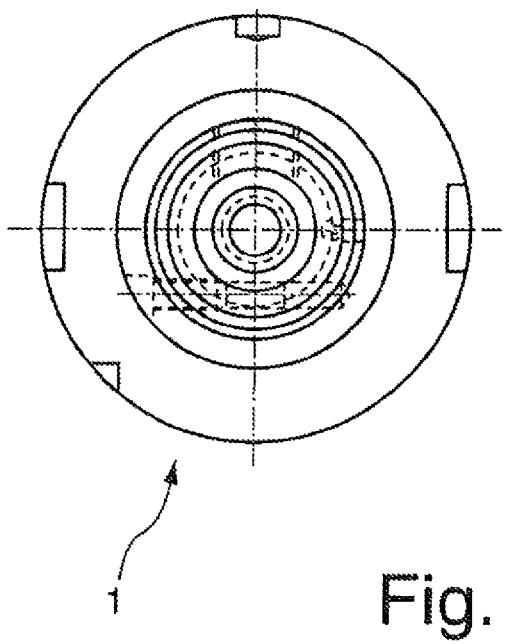

| | | | |
|---|---|---|---|
| 5,127,780 A * | 7/1992 | Massa | 409/234 |
| 5,286,042 A * | 2/1994 | Laube | 279/133 |
| 2005/0238451 A1 | 10/2005 | Hartman | |
| 2009/0179368 A1* | 7/2009 | Haimer | 269/54.2 |

FOREIGN PATENT DOCUMENTS

| | | |
|---|---|---|
| DE | 10 2009 053142 | 6/2011 |
| EP | 0 013 646 | 7/1980 |
| EP | 0 275 441 | 7/1988 |

OTHER PUBLICATIONS

English translation of German patent, DE 9002248U1, "Extension clamping device". Inventor, Schunk F., Aug. 2, 1990. Translated by USPTO.*

International Search Report for corresponding patent application No. PCT/EP2011/062731 dated Sep. 9, 2011.

* cited by examiner

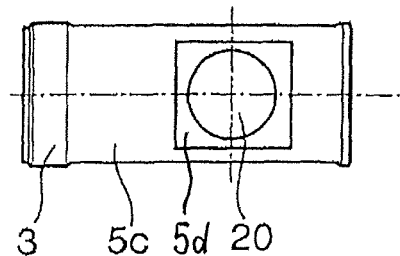
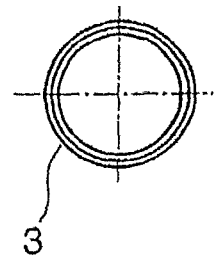
Fig. 7a　　　　Fig. 7b
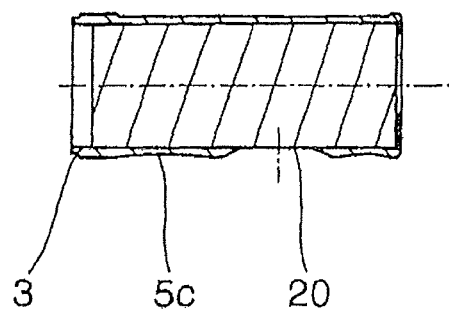
Fig. 7c

HYDRAULIC EXPANDING LOCK

The invention relates to an hydraulic expansion chuck with a positive torque synchronisation of a tool chucked in the hydraulic expansion chuck, according to the preamble of claim 1.

Such an hydraulic expansion chuck is known from DE 9002248 U1. DE 9002248 U1 shows and describes an hydraulic expansion chuck, wherein a tool received in an expanding bush, in addition to hydraulic chucking by a security bolt arranged radially and displaceably in a main body, can be mechanically clamped. The security bolt arranged in the main body can be moved into positive engagement with a driving surface provided on the tool shaft via a radial opening provided in the expanding bush. A tool received in the expanding bush can thus be clamped in a force-fitting manner by the expanding bush and, in addition, can be clamped positively by the security bolt. The security bolt is, however, connected to the clamping set arranged in the main body, which charges the expanding bush with hydraulic pressure, by a two-part, spring-loaded valve guided in the main body in such a way that the security bolt can only be moved into or out of engagement with the driving surface on the tool shaft, depending on a clamping or release operation of a clamping screw. This functional coupling of the security bolt using the clamping screw of the clamping set indeed serves to facilitate the application of the hydraulic expansion chuck insofar as only the clamping screw is to be applied for chucking or releasing the tool; however, it results overall in a technically cost-intensive construction of the hydraulic expansion chuck and in a higher susceptibility to faults and higher production costs.

Based on this, the object of the invention is to provide an hydraulic expansion chuck that, despite a simplified, compact design, enables a reliable torque synchronisation of a chucked tool.

This object is solved by an hydraulic expansion chuck with the features of claim 1. The hydraulic expansion chuck according to the invention is formed from a main body and an expanding bush which is inserted into the main body to form at least one pressure chamber for chucking a tool in a force-fitting manner. The expanding bush has a radial opening arranged in alignment with a driver contained displaceably in the main body, which can be moved via the opening into positive engagement with a driving surface on the tool shaft of the tool which is to be received in the expanding bush. The hydraulic expansion chuck according to the invention is characterised by a driver having a driver screw which can be driven from radially outside the hydraulic expansion chuck, which is screwed in to a threaded bore formed in the main body in alignment with the radial opening in the expanding bush.

In contrast with the initially discussed prior art according to DE 90002248 U1, in the hydraulic expansion chuck according to the invention, the driver can thus be arranged for functional decoupling from a clamping set provided in the main body for the hydraulic pressure loading of the hydraulic expansion chamber, and can be spatially separated. The cited clamping set typically comprises a clamping screw, which applies pressure to a pressure fluid fed to the pressure chamber between the expanding bush and the main body via a clamping piston. According to the invention, the driver screw can now be activated at any moment and without having to consider the operative status of the clamping set or the clamping status of the expanding bush. Due to the functional and structural decoupling of the driver from the clamping set, the construction of the hydraulic expansion chuck is made considerably simpler, which leads to a compact construction and contributes to maintaining low production costs. Nevertheless, a tool received in the expanding bush can be clamped axially and for transferring the torque in the main body via the positive engagement of the driver with the driving surface on the tool shaft. At a corresponding lower tolerance of the radial opening of the expanding bush, the expanding bush can be clamped both axially via the driver and also in the rotational direction around the longitudinal central axis of the hydraulic expansion chuck.

The expanding bush is preferably arranged fundamentally fixed in terms of a seal of the at least one pressure chamber in the main body of the hydraulic expansion chuck. A fixed arrangement is achieved in particular by injecting, soldering and/or welding the expanding bush. In this case, further sealing measures, such as O ring sealing, are not necessary. Thus an additional chucking and bearing position is achieved by the driver that can be moved into positive engagement with the tool. This is because a tool received in the chuck undergoes a mechanical clamping force at an additional position, as well as the hydraulic clamping force from the expanding bush, which, when considered in an axial direction, can be inserted into the tool at one or more positions. Thus the number of clamping or bearing positions fixing the tool in the hydraulic expansion chuck can be increased, which results in higher clamping force, concentricity and rigidity of the hydraulic expansion chuck overall. The compactly designed hydraulic expansion chuck according to the invention is therefore suited to the handling of materials that are difficult to free-cut, where it depends on the transfer of the largest torques.

Furthermore, simple and user-friendly operation is enabled by the hydraulic expansion chuck according to the invention. After the tool shaft has been inserted into the hydraulic expansion chuck, the driver screw is screwed in, such that this rests lightly against a driving surface on the tool shaft. This serves to guide and align the driving surface of the tool shaft onto the driver screw. Then the tool shaft is clamped by the expanding bush. Afterwards, the tool shaft is clamped radially by the driver screw, which engages at the driving surface of the tool shaft when in a clamped status, which in particular corresponds to de-clamping according to DIN 1835. The user-friendly operation is particularly enabled by the functional decoupling of the axial and radial clamping forces that are to be applied.

Advantageous or preferred developments of the hydraulic expansion chuck according to the invention are the subject matter of dependent claims.

As far as the configuration of the driver and the driving surface on the tool shaft are concerned, partly known or standardised configurations can be resorted to.

The driving surface on the tool shaft can be designed, for example, as a surface parallel to the axis according to DIN 1835 B or as a suitable surface at a predetermined angle to the longitudinal central axis of the tool, according to DIN 1835 E.

In addition, the operation of the driver can take place radially, i.e. perpendicular to the longitudinal central axis of the hydraulic expansion chuck or tool, or at a predetermined angle that is lower than 90° to the longitudinal central axis. Depending on the alignment of the axis of the driver screw and the alignment of the driving surface on the tool shaft, the driver screw can act directly or indirectly upon the driving surface. Thus the driver screw can have a pressure surface arranged frontally in a fixed manner thereon, which is designed for direct, laminar contact on the driving surface on the tool shaft. In this case, the driver is reduced onto the driver screw, which can be moved into positive engagement with the driving surface on the tool shaft. This driver screw is designed as a headless screw, for example.

Alternatively to this, the driver screw can be connected frontally to a pressure transfer unit having a pressure surface, which is designed for laminar contact on the driving surface on the tool shaft. In this case, the driver screw acts indirectly upon the driving surface on the tool shaft via the frontally arranged pressure transfer unit. The pressure transfer unit is received rotatably or twistably to the driver screw, but is, however, pressure-resistant, such that a radial clamping force can be transferred indirectly from the driver screw to the pressure transfer unit to the driving surface. For this, the pressure transfer unit is preferably designed as a sphere with a pressure surface, which is guided in rigid compression in the driver screw. Thus a simple driver design is enabled, which is formed from the driver screw and the pressure transfer unit.

In both situations discussed, the configuration of the driver gives rise to no difficulties. Nevertheless, a reliable, axial and rotation-proof specification of the tool received in the expanding bush is enabled during a simple operation.

Should the driver be formed from the driver screw and the pressure transfer unit, the pressure transfer unit can advantageously be connected to the driver screw in the form of a ball-and-socket joint. Due to the twistability of the pressure transfer unit relative to the driver screw, this configuration enables an optimised alignment of the pressure surface designed on the pressure transfer unit according to the driving surface designed on the tool shaft. This is particular advantageous if the driving surface is a suitable surface designed at a predetermined angle to the longitudinal central axis of the tool according to DIN 1835 E.

For the purposes of attaining a high level of tool concentricity, in a preferred development, the expanding bush defines, with the main body, at least two axially-spaced annular pressure chambers and the radial opening lies in the region of the axial distance between both pressure chambers. A tool shaft received in the expanding bush is clamped at at least two positions, spaced in an axial direction, via the at least two axially-spaced pressure chambers, whereby a positional displacement caused by clamping or centrifugal forces between the longitudinal central axis of the tool and the longitudinal central axis of the hydraulic expansion chuck is counteracted. With the final clamping position obtained by the driver, the number of clamping or bearing positions thus increases to at least three, which leads to the above-mentioned effects of high concentricity and rigidity. The transfer of the radial opening into the region of the axial distance between both pressure chambers enables both pressure chambers to be sealed from the radial opening, which is to be controlled without any problems.

Alternatively, the expanding bush can also define, with the main body, only an annular pressure chamber, which is continuous with the exception of an island-like region, wherein the radial opening lies within the region of the island. Due to an arrangement of the radial opening within the island-like region, a reliable sealing of the pressure chamber from the radial opening can be achieved, even in the alternative development of the hydraulic expansion chuck according to the invention.

To form the at least one pressure chamber, the expanding bush preferably has an external peripheral surface with annular grooves, and the main body has a cylindrically processed internal peripheral surface. The external peripheral surface of the expanding bush can be processed more easily due to problem-free access than the internal peripheral surface of the main body, which often has narrow dimensions. Therefore, the internal peripheral surface of the main body is preferably designed cylindrically in the hydraulic expansion chuck according to the invention, while the external peripheral surface of the expanding bush corresponds to the structure of the at least one pressure chamber with annular grooves, or—in general terms—possesses a corresponding surface structure. Moreover, the expanding bush can be embodied with relatively thin walls in the regions in which the annular grooves forming the pressure chambers are provided, and with relatively thick walls in the regions lying in-between, which is achieved by the construction of the pressure chamber on the external periphery of the expanding bush. When the pressure chamber is loaded with pressure, the expanding bush thus undergoes no warping in the thick-walled regions, compared to the thin-walled regions, such that, according to the invention, the radial opening can be transferred to the thick-walled regions, i.e. in particular to the region between two pressure chambers. Due to a fixed arrangement of the expanding bush in the main body of the hydraulic expansion chuck, which can be achieved by injecting, soldering or welding the expanding bush, such a reliable sealing of the pressure chambers from the radial opening can be guaranteed.

The pressure feed into the at least one pressure chamber between the expanding bush and the main body preferably takes place through a main pressure feed channel designed in the main body or the expanding bush. In the case of the above-discussed development, wherein the expanding bush has annular grooves on its external periphery for the formation of the at least one pressure chamber, it can however be advantageous, due to the sealing, to transfer the pressure feed channel leading to the at least one pressure channel into the main body.

Figure 2:
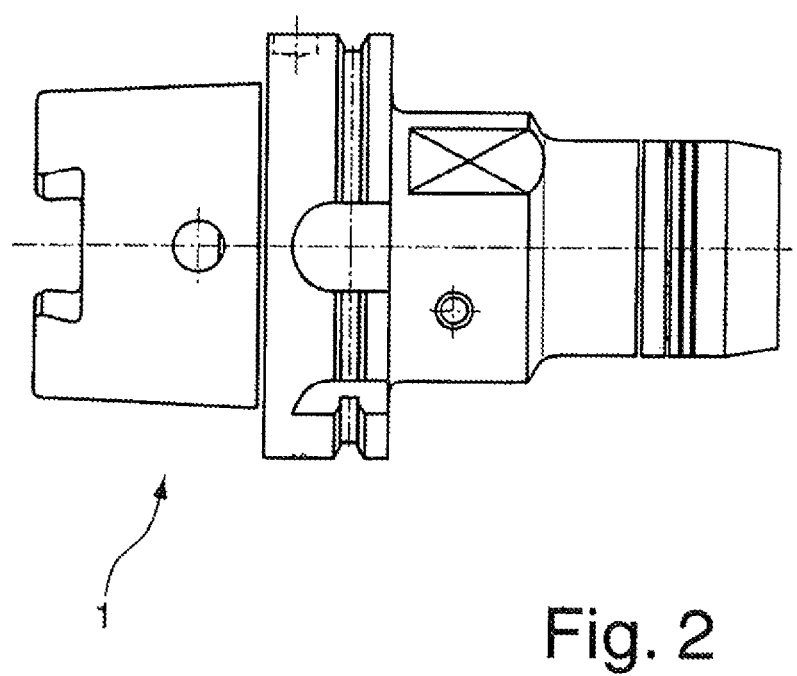
Figure 3:
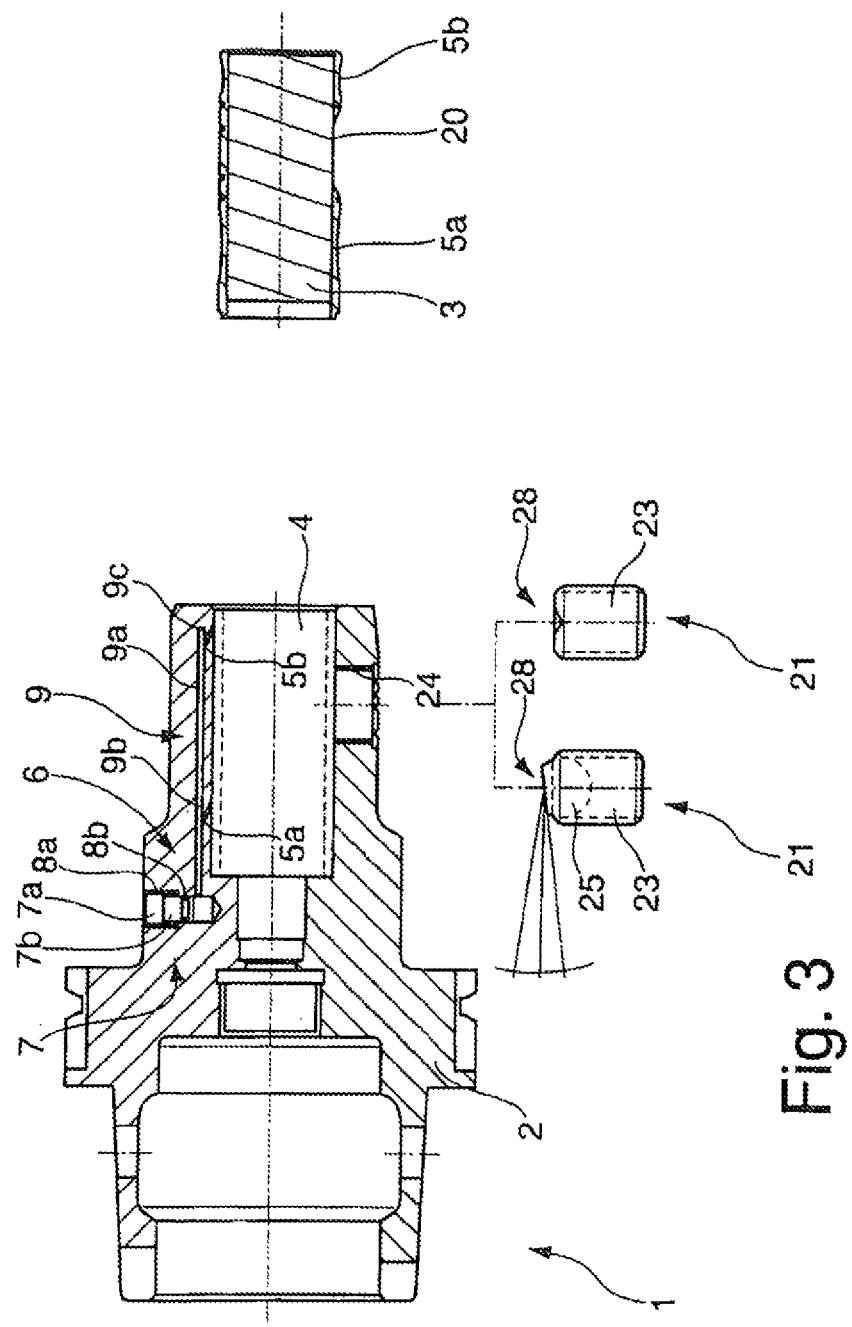
Figure 4:
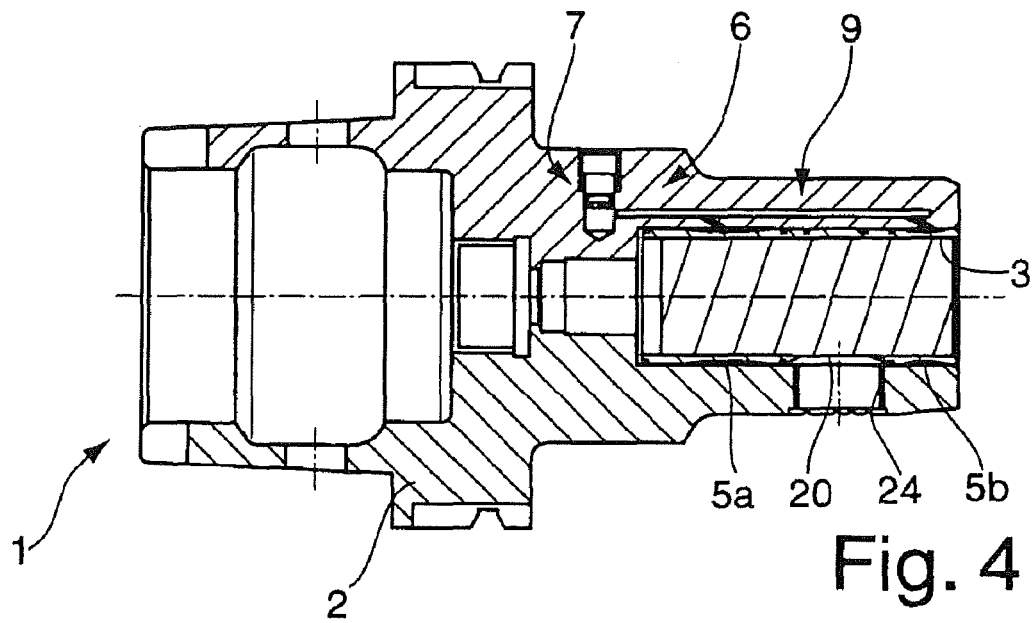
Figure 5A:
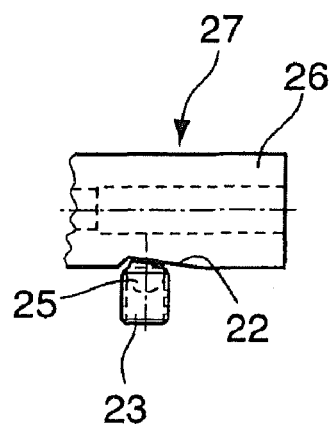
Figure 5B:
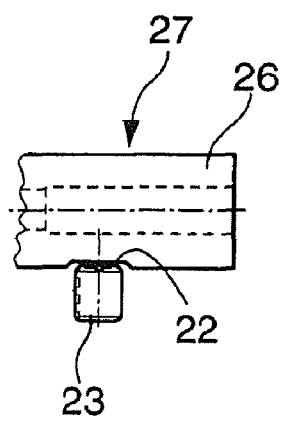
Figure 6A:
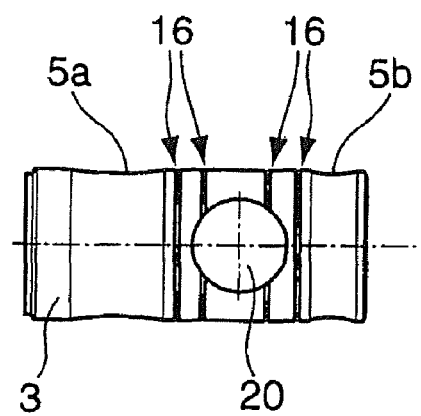
Figure 6B:
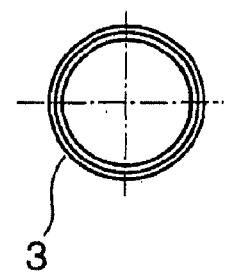
Figure 6C:
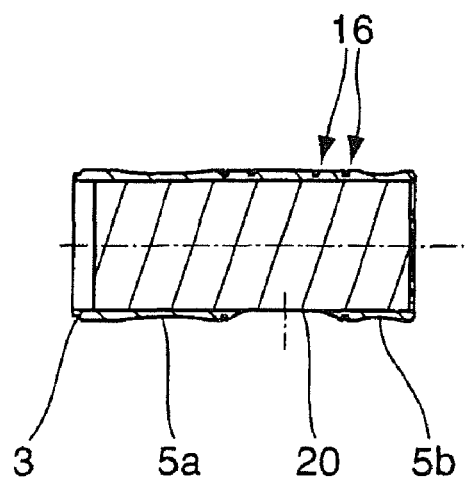

A preferred exemplary embodiment of the hydraulic expansion chuck is illustrated below using the figures enclosed. The following are shown in the figures:

FIG. 1 shows an axial top view of the hydraulic expansion chuck according to the invention, FIG. 2 shows a lateral view of the hydraulic expansion chuck according to the invention, FIG. 3 shows a longitudinal section through the hydraulic expansion chuck according to the invention in an expanded depiction, FIG. 4 shows a longitudinal section through the hydraulic expansion chuck according to the invention, FIGS. 5a, 5b show two exemplary driver systems, FIGS. 6a, 6b, 6c show a lateral view, a top view and a longitudinal section of an expanding bush, FIGS. 7a, 7b, 7c show a lateral view, a top view and a longitudinal section of an alternative expanding bush.

FIGS. 1 to 4 show the design of an hydraulic expansion chuck 1 according to the invention. The hydraulic expansion chuck 1 has a main body 2 and an expanding bush 3. The main body 2 has, at its left-hand end in FIGS. 2, 3 and 4, a known fastening chuck cone, here in the form of a hollow shank taper, to attach the hydraulic expansion chuck 1 to its (not shown) tool machine spindle. On its right-hand end in FIGS. 2, 3 and 4, the main body 2 has a central cylindrical bore hole 4 to receive the expanding bush 3. FIG. 4 shows the hydraulic expansion chuck 1 with the expanding bush 3 injected into the cylindrical bore hole 4 to receive a tool (not shown). The expanding bush 3 forms, on its external periphery, in conjunction with the cylindrical internal surface of the cylindrical bore hole 4 formed in the main body 2, two pressure chambers 5a, 5b arranged at an axial distance from one another, which can be loaded with hydraulic pressure via an hydraulic clamping system 6.

As can be seen from FIGS. 3, 4 and 6a to 6c, the expanding bush 3 has an external peripheral surface with annular grooves 16 for the formation of both pressure chambers 5a, 5b.

The hydraulic clamping system 6 has a clamping set 7 and a pressure feed channel system 9. The clamping set 7 is formed from a clamping screw 7a and a clamping piston 7b activated by the clamping screw 7a. The clamping screw 7a is screwed in to a radial threaded bore 8a formed in the main body 2, while the clamping piston 7b is guided in a bore hole 8b formed in the main body 2 in alignment with the threaded bore 8a. The pressure feed channel system 9 connects the section of the bore hole 8b loaded with pressure by the clamping piston 7b with both of the pressure chambers 5a, 5b defined between the expanding bush 3 and the main body 2. For this purpose, the pressure feed channel system 9 has an axial main channel 9a formed in the main body 2 outside of the cylindrical bore hole 4, which is connected to both pressure chambers 5a, 5b via the branched channels 9b, 9c. By operating the clamping set 7, the pressure fluid located in the bore hole 8b can thus be loaded with pressure, which is finally transferred to both pressure chambers 5a, 5b via the pressure feed channel system 9. The pressure generated in both pressure chambers 5a, 5b causes the expanding bush 3 to warp correspondingly radially inwards, whereby the tool shaft 26 of a tool 22 only shown in this periphery received in the expanding bush 3 is clamped in a force-fitting manner.

In order to guarantee rotation-free driving of the tool even when the force-fitting clamping of the expanding bush 3 is no longer sufficient, the hydraulic expansion chuck according to the invention also has a purely mechanically functioning torque synchronisation system, with which the tool that has already been chucked in a force-fitting manner can be clamped axially and in the direction of rotation.

For this, the expanding bush 3 has, as can be seen in FIGS. 6a and 6c, a radial opening 20 in the region of the axial distance between both pressure chambers 5a, 5b. The opening 20 is arranged in alignment with a driver 21 held moveably in the main body 2, which can, via the opening 20, be moved into positive engagement with a driving surface 22 (cf. FIG. 5a or 5b) on the tool shaft of a tool received in the expanding bush 3. The transfer of the radial opening 20 into the region of the axial distance between both pressure chambers 5a, 5b enables both pressure chambers 5a, 5b to be sealed from the radial opening 20, which is to be controlled without any problems.

The hydraulic expansion chuck 1 according to the invention features a driver 21 having a driver screw 23 that can be activated radially outside the hydraulic expansion chuck 1, which is screwed in to a threaded bore 24 formed in the main body 2 in alignment with the radial opening 20 in the expanding bush 3. In the example shown in the figures, the driver 21 is aligned radially, i.e. perpendicular to the longitudinal central axis of the hydraulic expansion chuck 1 or tool. Alternatively, the driver 21 can also be aligned, however, at a predetermined angle of below 90° C. to the longitudinal central axis.

As can be seen from FIGS. 3 and 4, the driver 21 is arranged functionally independent and spatially separated from the clamping set 7 provided in the main body 2 for hydraulic pressure loading of both pressure chambers 5a, 5b. According to the invention, the driver screw 23 can now be activated radially outside the hydraulic expansion chuck at any moment and without consideration for the operative status of the clamping set 7 or the clamping status of the expanding bush 3. The tool can be clamped axially and for transferring torque in the main body 2 by the positive engagement of the driver 21 with the driving surface 22 (cf. FIG. 5a or 5b) on the tool shaft of a tool received in the expanding bush 3. Due to correspondingly low tolerance of the radial opening 20 of the expanding bush 3, the expanding bush 3 can be clamped together both axially and in the rotational direction around the longitudinal central axis of the hydraulic expansion chuck 1 via the driver 21.

As is shown in FIGS. 3 and 4, as regards the configuration of the driver 21 and the driving surface 22, partly known or standard configurations are largely reverted to. The driving surface 22 on the tool shaft 26 of a tool 27 only depicted in this periphery can, for example, be designed as a surface parallel to the axis according to DIN 1835 B or as a suitable surface at a predetermined angle to the longitudinal central axis of the tool according to DIN 1835 E. Depending on the alignment of the axis of the driver screw 23 and the alignment of the driving surface 22 on the tool shaft, the driver screw 23 can act directly or indirectly on the driving surface 22. In the example shown in FIG. 5b, the driver screw 23 has a frontal pressure surface, which is designed for direct laminar contact with the driving surface 22 on the tool shaft 26. In this case, the driver 21 is reduced to the driver screw 23, which can be moved into positive engagement with the driving surface 22 on the tool shaft 26. Alternatively, as is shown in FIG. 5b, the driver screw 23 can be connected frontally to a pressure transfer unit 24 via a ball-and-socket joint, having a pressure surface 28 designed for laminar contact with the driving surface 22 on the tool shaft. This configuration enables the pressure transfer unit 25 to rotate relative to the driver screw 23 and thus for there to be an alignment of the pressure surface formed on the pressure transfer unit 25 according to the driving surface 22 formed on the tool shaft. In this case, the driver screw 23 thus acts indirectly on the driving surface 22 on the tool via the frontally arranged pressure transfer unit 24. The driver 21 is thus formed from the driver screw 23 and the pressure transfer unit 24.

Radial clamping of the tool shaft 26 is enabled with simultaneous axial security by both of the above-described embodiments of the driver 21, since, after the driver 21 has been transferred into its clamping position, its pressure surface 28 is subject to pressure on the driving surface 22, thus preventing an axial release.

FIGS. 7a to 7c show a configuration of the expanding bush 3 which is a modification of the configuration shown in FIGS. 6a to 6c. In this modification, the expanding bush 3, with the main body 2, defines an annular pressure chamber 5c, which, with the exception of an island-like region 5d, is continuous. Here, the radial opening 20 lies within the island-like region 5d.

The invention claimed is:
1. A hydraulic expansion chuck comprising:
a main body and;
an expanding bush inserted in the main body to form at least one pressure chamber for chucking a tool, wherein the expanding bush has a radial opening and the hydraulic expansion chuck includes only a single driver held radially moveable in the main body and arranged in alignment with the radial opening, wherein the single driver can be moved via the opening into positive engagement with a driving surface on a tool shaft of the tool which is to be received in the expanding bush,
wherein the single driver is in the form of a driver screw that can be activated radially outside the hydraulic expansion chuck, which is screwed into the threaded bore formed in the main body in alignment with the radial opening, wherein the driver has a pressure surface and when the driver is in a clamping position, the pressure surface exerts pressure on the driving surface of the tool shaft of the tool, wherein the single driver is the only driver used to axially retain the tool in the expanding bush.

2. The hydraulic expansion chuck according to claim 1, wherein the driver screw has a frontal pressure surface arranged tightly thereon, which acts on the driving surface on the tool shaft of a tool which is to be received in the expanding bush.

3. The hydraulic expansion chuck according to claim 1, wherein the driver screw acts on the driving surface on the tool shaft of a tool which is to be received in the expanding bush via a frontally arranged pressure transfer unit with a pressure surface formed thereon.

4. The hydraulic expansion chuck according to claim 3, wherein the pressure transfer unit is connected to the driver screw for the rotatable alignment of the pressure surface in the form of a ball-and-socket joint.

5. The hydraulic expansion chuck according to claim 3, wherein the pressure transfer unit is designed as a sphere with the pressure surface, which is received in rigid compression and for aligning the pressure surface rotatably in the driver screw.

6. The hydraulic expansion chuck according to claim 1, wherein the expanding bush defines, with the main body, at least two axially-spaced annular pressure chambers, and in that the radial opening lies in the region of the axial distance between both pressure chambers.

7. The hydraulic expansion chuck according to claim 1, wherein the expanding bush, with the main body, defines an annular pressure chamber, which, with the exception of an island-like region, is continuous, wherein the radial opening lies within the island-like region.

8. The hydraulic expansion chuck according to claim 1, wherein, for the formation of the at least one pressure chamber, the expanding bush has an external peripheral surface possessing at least one annular groove and the main body has a cylindrical internal peripheral surface.

9. The hydraulic expansion chuck according to claim 8, wherein the at least one pressure chamber is connected to a pressure feed channel system formed in the main body.

\* \* \* \* \*